(12) United States Patent
Seo et al.

(10) Patent No.: US 8,790,823 B2
(45) Date of Patent: Jul. 29, 2014

(54) BATTERY UNIT AND BATTERY PACK HAVING LESS RESISTANCE AND IMPROVED CONTACTS

(75) Inventors: Kyung-Won Seo, Yongin-si (KR); Jeong-Deok Byun, Yongin-si (KR); Eun-Ok Kwak, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 543 days.

(21) Appl. No.: 13/105,407

(22) Filed: May 11, 2011

(65) Prior Publication Data

US 2012/0202109 A1 Aug. 9, 2012

Related U.S. Application Data

(60) Provisional application No. 61/440,616, filed on Feb. 8, 2011.

(51) Int. Cl.
*H01M 2/30* (2006.01)
*H01M 2/02* (2006.01)

(52) U.S. Cl.
USPC ............ 429/183; 429/181; 429/162; 429/146

(58) Field of Classification Search
USPC .................. 429/136, 146, 162, 163, 179–184
See application file for complete search history.

(56) References Cited

U.S. PATENT DOCUMENTS

| 7,615,309 B2 | 11/2009 | Kim et al. | |
|---|---|---|---|
| 2003/0141842 A1 | 7/2003 | Izawa et al. | |
| 2005/0140338 A1* | 6/2005 | Kim et al. | 320/150 |
| 2006/0162149 A1* | 7/2006 | Ha et al. | 29/623.1 |
| 2008/0102357 A1 | 5/2008 | Hong et al. | |
| 2008/0226974 A1 | 9/2008 | Jang et al. | |
| 2009/0186268 A1 | 7/2009 | Song | |
| 2010/0075220 A1* | 3/2010 | Heo | 429/163 |

FOREIGN PATENT DOCUMENTS

| KR | 1020050060187 A | 6/2005 |
|---|---|---|
| KR | 1020070049255 A | 5/2007 |

(Continued)

OTHER PUBLICATIONS

Korean Office Action issued by the KIPO on Mar. 21, 2013 in the examination of the Korean Patent Application No. 10-2012-0011294, which corresponds to the U.S. Appl. No. 61/440,616 and Request for Entry of the Accompanying Office Action attached herewith.

(Continued)

*Primary Examiner* — Carlos Barcena
(74) *Attorney, Agent, or Firm* — Robert E. Bushnell, Esq.

(57) ABSTRACT

A battery unit and a battery pack including the battery unit having reduced resistance along the leads. The battery unit includes a battery unit including an electrode assembly arranged within a pouch and lead tabs extending to an outside of the pouch and being electrically connected to the electrode assembly, a frame to support the battery unit, the frame including a first portion to accommodate the pouch of the battery unit and a second portion to accommodate the lead tabs, lead members arranged between the lead tabs and the second portion of the frame and a plurality of coupling members to mechanically couple together the lead tabs, the lead member and the second portion of the frame.

18 Claims, 4 Drawing Sheets

(56) References Cited

FOREIGN PATENT DOCUMENTS

| | | | | |
|---|---|---|---|---|
| KR | 1020080038700 | | 5/2008 | |
| KR | 10-0872954 B | | 12/2008 | |
| KR | 10-0880389 B | | 1/2009 | |
| KR | 1020090078181 | | 7/2009 | |
| KR | 10-2009-0105319 | * | 10/2009 | ............ H01M 2/10 |
| KR | 1020090105319 A | | 10/2009 | |

OTHER PUBLICATIONS

Korean Office Action issued by the KIPO on Aug. 5, 2013 for a Korean application corresponding to the application No. 10-2012-0011294 and Request for Entry of the Accompanying Office Action attached herewith.

* cited by examiner

BATTERY UNIT AND BATTERY PACK HAVING LESS RESISTANCE AND IMPROVED CONTACTS

CLAIM OF PRIORITY

This application makes reference to, incorporates the same herein, and claims all benefits accruing under 35 U.S.C. §119 from an application for BATTERY UNIT AND BATTERY PACK HAVING THE SAME earlier filed in the U.S. Patent & Trademark Office on 8 Feb. 2011 and there duly assigned Ser. No. 61/440,616.

BACKGROUND OF THE INVENTION

1. Field of the Invention

The present invention relates to a battery unit and a battery pack having improved conductivity and improved contacts along the charging and discharging paths, leading to improved battery efficiency.

2. Description of Related Art

Due to the advantages thereof, secondary batteries are applied to various technical fields and are used as an energy source in mobile electronic appliances such as digital cameras, cellular phones, laptop computers, etc. Moreover, secondary batteries are noticed as an energy source in hybrid electric vehicles, which are suggested as a solution for solving air pollution caused by conventional internal combustion engines that use fossil fuels such as gasoline and diesel.

Along the charging and discharging paths of battery units are lead tabs and lead members electrically connected to the lead tabs. I have noticed that this connection between the lead tab and the lead member is made by a weld. The welding process generates a lot of heat, thereby causing damage to nearby components. Also, I have noticed that the integrity of welds is not always adequate, as the bonding strength may be limited and the surface area of the weld may be limited. As a result, what is needed is an improved design and method of attaching the lead members to the lead tabs that does not disrupt or threaten other components of the battery while providing a stronger, less resistant contact by increasing the surface area of contact.

SUMMARY OF THE INVENTION

Accordingly, it is an aim of the present invention to provide an improved design for a battery pack that improves charging and discharging efficiency.

It is also an aim of the present invention to improve the electrical contact between the lead tabs and the lead members of each battery unit.

According to one aspect of the present invention, there is provided a battery pack that includes a battery unit including an electrode assembly arranged within a pouch and lead tabs extending to an outside of the pouch and being electrically connected to the electrode assembly, a frame to support the battery unit, the frame including a first portion to accommodate the pouch of the battery unit and a second portion to accommodate the lead tabs, lead members arranged between the lead tabs and the second portion of the frame and a plurality of coupling members to mechanically couple together the lead tabs, the lead member and the second portion of the frame.

Each of the coupling members may be electrically connected to a corresponding one of the lead members and a corresponding one of the lead tabs. Each of the lead members may be a rectangular rigid metal block having two major surfaces opposite each other and a side surface perpendicular to the two major surfaces, each of the two major surfaces may be perforated by a plurality of coupling apertures that accommodate a passage of the coupling members, the side surface may be perforated by a first and a second side aperture, the first side aperture may couple with a bus bar and the second side aperture may provide input and output of electrical signals from and to a controller to control the battery pack. The plurality of lead members may include a first lead member and a second lead member, a portion of the second portion of the frame may separate the first lead member from the second lead member. The second portion of the frame may include an insulating material. The second portion of the frame may include a first space that accommodates the first lead member and a second space that accommodates the second lead member.

The battery pack may also include a plurality of conductive plates arranged over the lead tabs and being coupled to the frame, the lead members and the lead tabs by the coupling members. Each of the frame, the lead members and the lead tabs may be perforated by a plurality of apertures, the coupling members extending through the apertures of the frame, the lead members and the lead tabs. Each of the coupling members may be a nut and bolt assembly. Each of said lead tabs may be perforated by two apertures, each of said lead tabs may have a left side and a right side opposite from said left side, a total width of the lead tab may be a distance from the left side to the right side, one of said two apertures may be spaced-apart from the left side of the lead tab by ⅛th of the total width of the lead tab, another of the two apertures may be spaced-apart from the right side of the lead tab by ⅛th of the total width of the lead tab. The first portion of the frame may include a metal to provide mechanical rigidity and excellent thermal conductivity, the first portion may include a flat plate with curved ribs arranged at two opposing edges of the flat plate to surround the battery unit. A height of the curved ribs may be greater than a thickness of the battery unit. The flat plate may cover a first major surface of the battery unit, a second and opposite major surface of the battery unit may be exposed by the frame.

The lead members may be integrally formed and inseparable from the second portion of the frame, the second portion of the frame may be produced via an injection molding process where the lead members are arranged together in an injection molding frame during the injection molding process. The second portion of the frame may include fixing protrusions that extend through fixing apertures of the lead members to prevent the lead members from being separated from the second portion of the frame. Each of the lead tabs may include a proximal end connected to the electrode assembly of the battery unit and a distal end furthest from the battery unit, a portion of each lead member may cover the distal end of a corresponding one of the lead tabs. Each of the lead tabs may be in surface contact with a corresponding one of the lead members. The battery pack may include conductive plates arranged over the lead tabs and being mechanically coupled to the lead tabs. Each of the lead tabs, the lead members, the second portion of the frame and the conductive plates may be perforated by apertures through which corresponding ones of the coupling members extend.

BRIEF DESCRIPTION OF THE DRAWINGS

A more complete appreciation of the invention and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
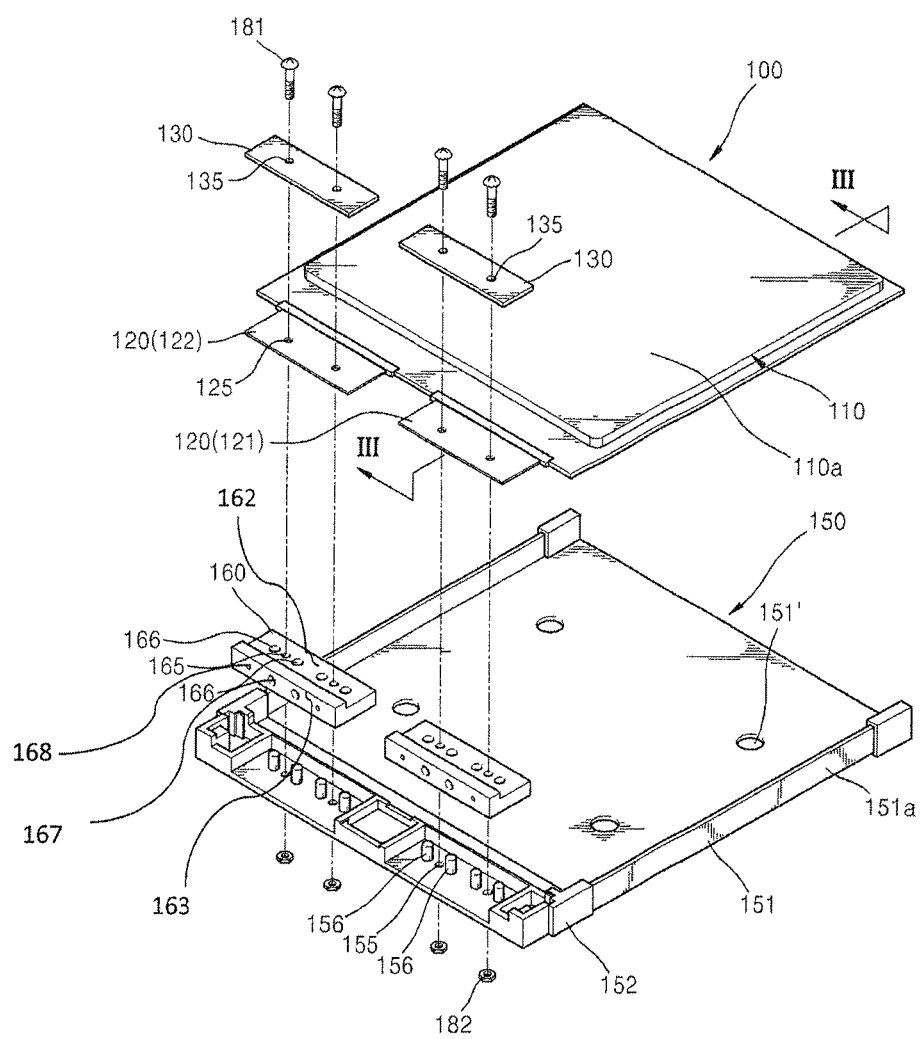
FIGS. 1 and 2 are exploded perspective views illustrating a battery pack according to an embodiment of the present invention.
Figure 2:
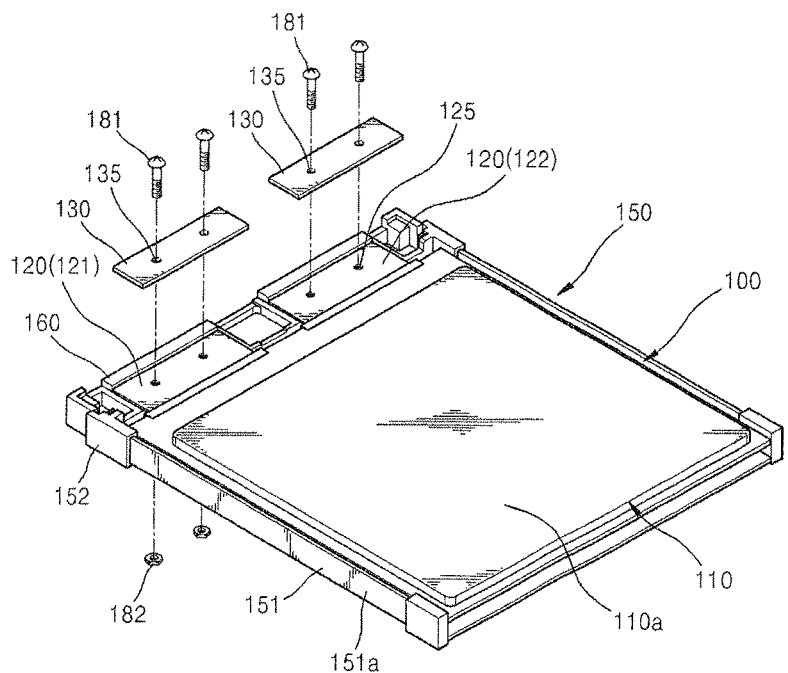
Figure 3:
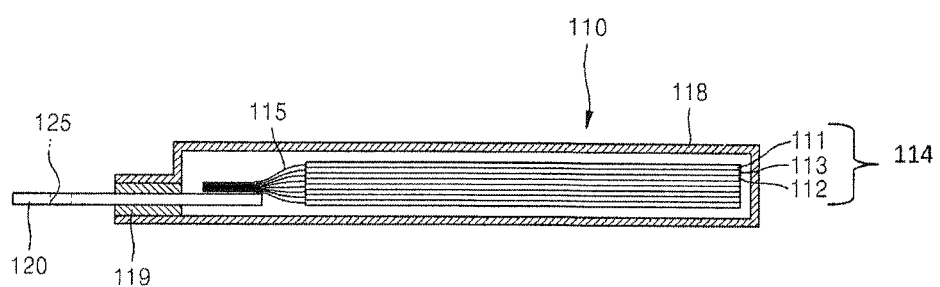
FIG. 3 is a cross-sectional view illustrating the battery pack of FIG. 1 cut along a line according to an embodiment of the present invention.

The present invention will now be described more fully with reference to the accompanying drawings, in which exemplary embodiments of the invention are shown. FIGS. 1 and 2 are exploded perspective views illustrating a battery pack according to an embodiment of the present invention. FIG. 3 is a cross-sectional view illustrating the battery pack of FIG. 1 cut along a line according to an embodiment of the present invention. Referring to FIGS. 1, 2, and 3, the battery pack includes a battery unit 100 and a frame 150 accommodating the battery unit 100.

The battery unit 100 is a rechargeable secondary battery, and may be, for example, a lithium ion battery. The battery unit 100 includes a battery cell 110 and a lead tab 120 that is electrically connected to the battery cell 110 and extends from the battery cell 110.

Referring to FIG. 3, the battery cell 110 may include an electrode assembly 114 that is produced by sequentially overlapping, for example, a positive electrode plate 111, a separator 113, and a negative electrode plate 112; a plurality of sheets of positive electrode plates 111, separators 113, and negative plates 112 may be stacked to provide a battery pack 100 having a high output and a high capacity. The electrode assembly 114 in which the positive electrode plates 111 and the negative electrode plates 112 are stacked by interposing the separators 113 is encapsulated in a pouch 118.

Although not shown in FIG. 3, the positive electrode plate 111 may be formed by coating a surface of a positive electrode collector with a positive electrode active material, and the negative electrode plate 112 may be formed by coating a surface of a negative electrode collector with a negative electrode active material.

An electrode tab 115 may be electrically connected to each of the positive electrode plates 111 and each of the negative electrode plates 112. The electrode tabs 115 drawn from the positive electrode plates 111 and the negative electrode plates 112 and stacked on one another may overlap one another, and the electrode tabs 115 in a collected form are electrically connected to the lead tab 120. For example, the electrode tab 115 and the lead tab 120 may be bonded to each other by using, for example, a ultrasonic wave welding technique.

The lead tab 120 serves as an external interconnection for the battery cell 110, and is drawn from the battery cell 110 to induce a current out of the battery cell 110. For example, a portion of the lead tab 120 is drawn out of pouch 118, and an insulating member 119 may be interposed between the lead tab 120 and the pouch 118 in order to secure insulation therebetween.

The lead tab 120 may be made out of a metal having a good conductivity, such as nickel, aluminum, or copper. For example, the lead tab 120 may include first and second lead tabs 121 and 122 having different polarities, and the first and second lead tabs 121 and 122 may be respectively electrically connected to the positive electrode plates 111 and the negative electrode plates 112 of each battery cell 110.

The battery cell 110 is electrically connected to an external load or to an external power supply unit via the lead tab 120. That is, a charging or a discharging current of the battery cell 110 is output to an external load or is input by the external power supply unit via the lead tab 120.

Since a charging or discharging current is concentrated on the lead tab 120, it is desired to reduce electric resistance as much as possible in order to increase the charging and discharging efficiencies. Accordingly, the lead tab 120 may be made out of a metal having a low electric resistance, such as nickel, aluminum, or copper.

A coupling hole 125 for electrical connection to a lead member 160 may be formed in the lead tab 120. The coupling hole 125 may be spaced-apart from an edge of the lead tab 120. A pair of coupling holes 125 may be formed at locations away from opposite edges of the lead tab 120.

The battery unit 100 is assembled on the frame 150, and is supported by the frame 150. The battery unit 100 and the frame 150 are assembled to face each other in opposite directions.

The frame 150 includes a first support portion 151 accommodating and supporting the battery cell 110, and a second support portion 152 accommodating and supporting the lead tab 120 drawn from the battery cell 110.

The frame 150 may protect the battery unit 100 from external impact, and, at the same time, may function as a heat dissipation plate emitting heat that is generated during charging or discharging, to the outside. To accomplish this, the first support portion 151 may be made out of a metal having mechanical rigidity and excellent thermal conductivity, such as aluminum.

The first support portion 151 may be a flat plate, and curved ribs 151a may be formed at two edges of the first support portion 151 to surround the battery cell 110. For example, the height of the ribs 151a may be greater than a thickness of the battery cell 110.

In order to provide high output and high capacity batteries, the battery cells 110 supported on the frame 150 may be stacked each as one unit on one another, and may be connected in series or in parallel to form a battery module. Here, predetermined space may be secured between the plurality of battery cells 110 due to the ribs 151a surrounding the battery cells 110. As the adjacent battery cells 110 are stacked with a spare space, the battery cells 110 may swell without contacting adjacent battery cells 110, and heat dissipation of the battery cells 110 may be facilitated.

A vent hole 151' may be formed in the first support portion 151 to dissipate heat. By using low-temperature air flowing in through the vent hole 151', heat generated due to the charging or discharging operations of the battery cells 110 may be dissipated.

The first support portion 151 is opened to the outside, and accordingly, an upper surface 110a of the battery cell 110 accommodated in the first support portion 151 is exposed to the outside, and heat generated within the battery cell 110 may be discharged to the outside completely.

The second support portion 152 accommodates the lead tab 120 drawn from the battery cell 110, where the lead member 160 is interposed between the second support portion 152 and the lead tab 120. For example, coupling member 181 and 182 may extend through the lead tab 120 and the lead member 160 and be coupled to the second support portion 152, thereby bonding the lead tab 120, the lead member 160, and the second support portion 152 together. To achieve this, a coupling hole 155 may be formed in the second support portion 152 so that the coupling members 181 and 182 may extend through the coupling hole 155, and the coupling hole 155 may be arranged at a location corresponding to the coupling holes 125 and 165 of the lead tab 120 and the lead member 160.

The second support portion 152 may be made out of an insulating material in order to insulate the lead member 160 from external environments and to prevent an electric short circuit. For example, the second support portion 152 may be made out of a polymer resin material such as polyphenylene sulfide (PPS), and may be provided as an injection molding product of a polymer resin material.

The lead member 160 may be assembled on the second support portion 152. For example, the lead member 160 may be fixed on the second support portion 152 such that a surface of the lead member 160 (front surface in the drawing) is exposed. When assembling the lead member 160 and the second support portion 152, the lead member 160 may be integrally coupled to the second support portion 152. For example, the lead member 160 may be integrated to the second support portion 152 when molding the second support portion 152. In detail, the second support portion 152 may be produced according to an injection molding technique, and when forming the second support portion 152 by injection molding, the lead member 160 may be disposed together in an injection molding frame and a raw material paste may be injected, thereby hardening the raw material paste and obtaining the second support portion 152 integrally formed with the lead member 160.

Each lead member 160 may be a rigid, metal rectangular block having two major surfaces 162 opposite each other and a side surface 163 that is perpendicular to the major surfaces 162. Each of the major surfaces 162 of lead member 160 is perforated by a plurality of coupling holes 165 through which coupling members 181 extend to couple together the lead member 160 to the lead tabs 120 and second support portion 152 of frame 150.

A fixing hole 166 may be formed in one of the major surfaces 162 of lead member 160 to couple the lead member 160 to the second support portion 152. For example, a fixing protrusion 156 protruded from the second support portion 152 may be inserted into the fixing hole 166 of the lead member 160 to thereby integrate the lead member 160 to the second support portion 152. The fixing protrusion 156 may be formed by injecting a raw material paste into the fixing hole 166 of the lead member 160 when forming the second support portion 152 by an injection molding technique.

The fixing hole 166 formed in the lead member 160 may be formed to be adjacent to the coupling hole 165. According to necessity, a plurality of fixing holes 166 may be formed. For example, as illustrated in FIG. 1, a pair of fixing holes 166 may be formed, one on each side of each coupling hole 165. In addition, fixing protrusions 156 corresponding to the fixing holes 166 may be formed on the second support portion 152, and the fixing protrusions 156 may be formed in pairs with one fixing protrusion on each of two sides of each coupling hole 155.

The lead member 160 is electrically connected to the lead tab 120, and relays a charging or discharging current in and out of the battery cell 110. For example, a current generated in the battery cell 110 passes through the lead tab 120, and may be drawn out of the battery pack via the lead member 160 that is electrically connected to the lead tab 120.

The lead member 160 overlaps the lead tab 120 in surface contact, being adhered to each other via the coupling members 181 and 182 that pass through the coupling holes 125 and 165 formed in a location corresponding to the lead tab 120 and the lead member 160 respectively. The coupling members 181 and 182 may be coupled through the lead tab 120, the lead member 160, and the coupling hole 155 of the second support portion 152 in succession, thereby bonding the lead tab 120, the lead member 160, and the second support portion 152 together.

The lead member 160 may be made out of a metal having excellent conductivity, such as nickel, copper or aluminum, and may be approximately a rectangular metal block. For example, the lead member 160 may be a nickel-plated copper block.

The coupling hole 165 may be formed in the major surfaces 162 of lead member 160 to allow the lead member 160 to be bonded to the lead tab 120. The coupling hole 165 of the lead member 160 may be arranged at a location that corresponds to the coupling hole 125 of the lead tab 120. To couple the lead member 160 and the lead tab 120 to each other, for example, the lead member 160 and the lead tab 120 may overlap each other, and the coupling member 181 may be inserted through coupling holes 125 and 165 formed in locations corresponding to each other in the lead tab 120 and the lead member 160 respectively.

The lead member 160 and the lead tab 120 may be bonded to each other at the same time when the frame 150 and the battery unit 100 are coupled to each other. That is, the frame 150 and the battery unit 100 may be disposed to face each other such that the first support portion 151 faces the battery cell 110, and the second support portion 152 and the lead tab 120 face each other.

The second support portion 152 is disposed to face the lead tab 120, and the lead member 160 may be interposed between the second support portion 152 and the lead tab 120. For example, while the lead member 160 is fixed to the second support portion 152, the lead member 160 and the lead tab 120 may be disposed to face each other. The coupling members 181 and 182 may be assembled so as to pass through the lead tab 120, the lead member 160 and the second support portion 152 that overlap one another, thereby bonding the second support portion 152, the lead member 160, and the lead tab 120 together. As the coupling members 181 and 182 that couple the lead member 160 and the lead tab 120 to each other are coupled through the second support portion 152 of the frame 150, the battery unit 100 and the frame 150 may be coupled to each other.

In other words, as the lead member 160 and the lead tab 120 are bonded to each other, the frame 150 to which the lead member 160 is fixed and the battery unit 100 to which the lead tab 120 is fixed may also be coupled to each other at the same time. However, the present invention is not limited to this embodiment, and for example, an additional coupling structure for coupling the frame 150 to the battery unit 100 may be further included.

Any coupling structure that may be inserted through the coupling holes 125 and 165 formed in the lead tab 120 and the lead member may be used as the coupling members 181 and 182. For example, a bolt-nut assembly may be used as the coupling members 181 and 182. In particular, regarding a middle to large sized battery having a large capacity and high output, a thickness of a connection portion including the lead member 160 and the lead tab 120 needs to be increased, and accordingly, mechanical coupling by using the coupling members 181 and 182 rather than bonding by thermal welding may be advantageous. When bonding by thermal welding, a high output heat source is required, bonding intensity may be insufficient and distribution thereof may not be uniform. In addition, a weldable thickness may be limited. Thus, any structure that mechanically bonds the lead member 160 to the lead tab 120 may be used as the coupling members 181 and 182, and the coupling members 181 and 182 may not be limited to the illustrated nut-bolt structure illustrated in FIGS. 1 and 2.

A first surface of the lead tab 120, for example, a lower surface thereof is in surface contact with the lead member 160, and the lead tab 120 is forced against the lead member 160 by a coupling pressure of the coupling members 181 and 182, causing the lead tab 120 and the lead member 160 to be in close contact with each other. Here, a conductive plate 130 may be further attached to a second surface of the lead tab 120, for example, an upper surface of the lead tab 120.

The conductive plate 130 may be a flat plate, and may include a coupling hole 135 formed therein so that the coupling member 181 may pass through the coupling hole 135. The coupling hole 135 of the conductive plate 130 may be arranged at a location that corresponds to the coupling hole 125 of the lead tab 120. The coupling member 181 joining the lead member 160 and the lead tab 120 together may be inserted through the conductive plate 130, and the lead member 160, the lead tab 120, and the conductive plate 130 may be coupled together via the coupling members 181 and 182. That is, the coupling member 181 is consistently passed through the lead tab 120, the lead member 160, and the second support portion 152 of the frame 150, thereby simplifying an assembling operation of a battery pack.

The conductive plate 130 may reinforce an electrical connection of the connection portion between the lead member 160 and the lead tab 120 to thereby reduce electrical resistance of the connection portion and improve charging or discharging efficiency as a result. For example, the conductive plate 130 may provide a uniform surface pressure that forces the lead tab 120 with respect to the lead member 160, and a bonding force between the lead tab 120 and the lead member 160 may be improved accordingly. For example, the lead tab 120 may be compressed between the lead member 160 and the conductive plate 130 and be firmly bonded thereto. In addition, the conductive plate 130 provides an additional electrically conductive area besides the lead member 160 and the lead tab 120, thereby reducing an electrical resistance of a charging or discharging current.

Figure 4:
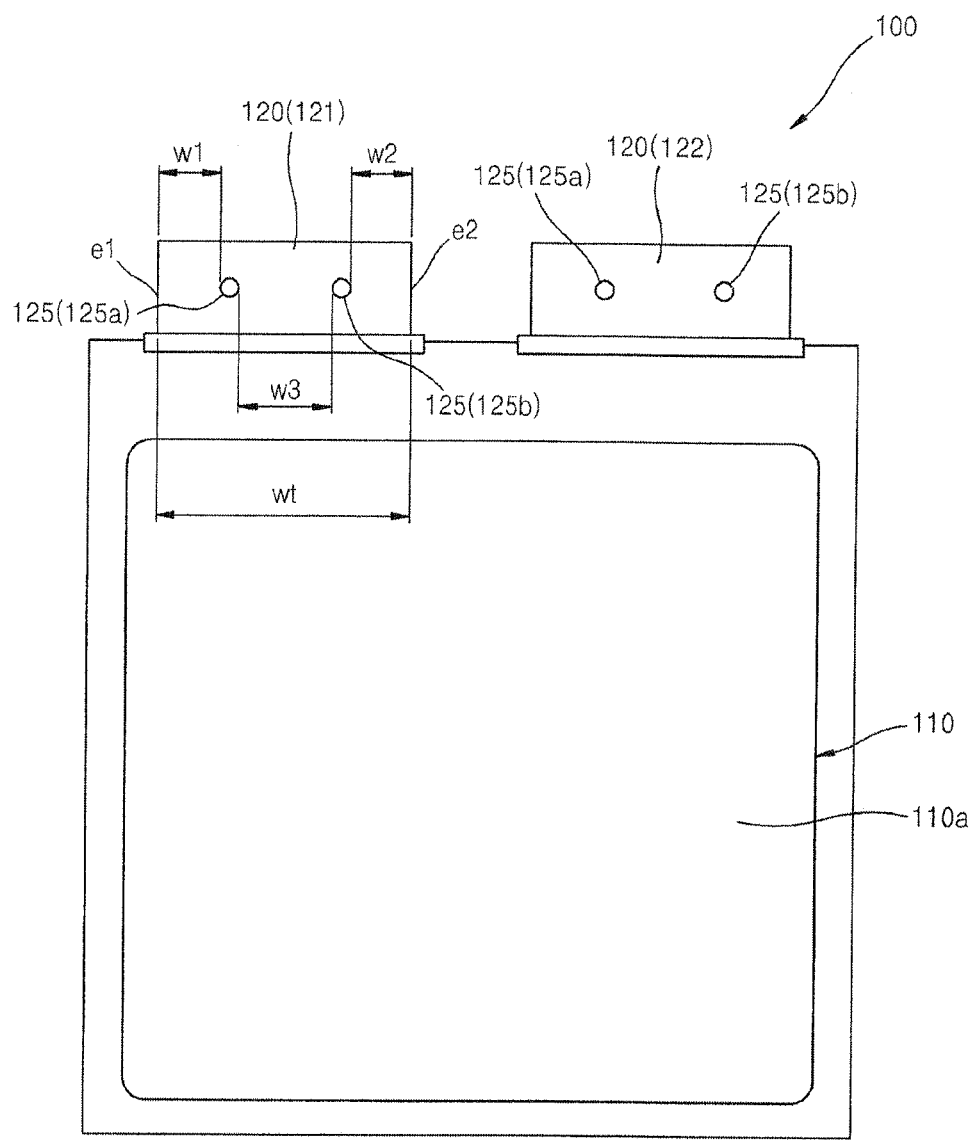
FIG. 4 is a detailed schematic view illustrating a structure of a coupling hole of the battery pack of FIG. 1, according to an embodiment of the present invention.

FIG. 4 is a detailed schematic view illustrating a structure of the coupling hole 125 of the battery unit 100 of FIG. 1 according to an embodiment of the present invention. Referring to FIG. 4, the coupling hole 125 is formed in the lead tab 120 that is drawn from the battery cell 110, and the lead tab 120 and the lead member 160 are bonded to each other via the coupling hole 125.

The coupling hole 125 may be a same structure and be arranged at the same locations in both the first and second lead tabs 121 and 122. Thus, the coupling hole 125 formed in the first lead tab 121 will be described only. However, description of the coupling hole 125 below also applies to two sides of each of the first and second lead tabs 121 and 122; alternatively, the description may be applied to only one of the first and second lead tabs 121 and 122.

The lead tab 120 forms a path of a charging or discharging current of the battery cell 110, and a current generated in the battery cell 110 flows through the lead tab 120 and is drawn outside through the lead member 160 that is electrically connected to the lead tab 120. Accordingly, in order to reduce electrical resistance of the entire charging or discharging path, a close contact needs to be maintained between the lead tab 120 and the lead member 160. For example, when some areas between the lead tab 120 and the lead member 160 are not in contact, a charging or discharging current is concentrated on other areas that have better contact. If a current is concentrated in only a predetermined area, resistance heat may accumulate, and this may increase the electrical resistance in a series, and a charging or discharging efficiency may ultimately be decreased.

Referring to FIG. 4, the coupling hole 125 may include a first coupling hole 125$a$ that is spaced-apart from a first edge e1 of the lead tab 120 by a first width w1 and a second coupling hole 125$b$ that is spaced-apart from a second edge e2 by a second width w2.

As the coupling hole 125 is formed in pairs on two sides of the lead tab 120, a coupling pressure by the coupling members 181 and 182 may be applied by the lead tab 120 relatively uniformly, and accordingly, the lead tab 120 may be adhered to the lead member 160 with a relatively uniform surface pressure. If instead a single coupling hole 125 is formed in the lead tab 120, a pressure of the coupling members 181 and 182 applied through the coupling hole 125 formed in the center may not provide a uniform surface pressure to the entire surface of the lead tab 120, and particularly, an edge of the lead tab 120 may not be closely adhered to the lead member 160 but may become separated from the lead member 160. This increases electrical resistance of the connection portion formed between the lead tab 120 and the lead member 160.

The locations of the first and second coupling holes 125$a$ and 125$b$ may be denoted by the first width w1 and the second width w2 away from the first and second edges e1 and e2 of the lead tab 120, and the first width w1 and the second width w2 provide design parameters about the locations of the coupling holes 125.

A ratio of the first width w1 to a total width wt of the lead tab 120 may preferably be about 12.5%. In other words, the first width w1 and the total width wt of the lead tab 120 may preferably have a ratio of 1:8.

Similarly, a ratio of the second width w2 to the total width wt of the lead tab 120 may preferably be about 12.5%. In other words, the second width w2 and the total width wt of the lead tab 120 may preferably have a ratio of 1:8.

The above ratio is preferred because when the coupling hole 125 is formed at a location close to an edge or a center of the lead tab 120, a coupling pressure of the coupling members 181 and 182 is not uniform over the first width w1 through the third width w3, and thus, for example, the lead tab 120 separates from the lead member 160 at the edge or at the center of the lead tab 120, and an electrical resistance between the lead tab 120 and the lead member 160 may increase accordingly.

For example, if the ratio of the first width w1 or the second width w2 by which the coupling hole 125 is separated from the edges e1 and e2 of the lead tab 120 to an entire width wt of the lead tab 120 exceeds 12.5%, the coupling hole 125 is formed more toward the center of the lead tab 120, and a coupling force is concentrated on the center. Accordingly, the edges e1 and e2 of the lead tab 120 may not be closely adhered to the lead member 160 but may become separated.

In contrast, when the ratio of the first width w1 or the second width w2 by which the coupling hole 125 is separated from the edges e1 and e2 of the lead tab 120 to an entire width wt of the lead tab 120 is less than 12.5%, the coupling hole 125 is formed more toward the edge of the lead tab 120, and a coupling force is concentrated on the edge of the lead tab 120. Accordingly, the center portion of the lead tab 120 may not be closely adhered to the lead member 160 but may become separated.

When the center or the edge of the lead tab 120 is separated, the lead tab 120 is not closely adhered to the lead member 160 in the separated portion, and thus electrical resistance increases and a charging or discharging efficiency decreases.

Considering the factors described above, as design factors regarding the locations of the coupling holes 125, the first width w1 or the second width w2 by which the coupling hole 125 is spaced-apart from the edges e1 and e2 of the lead tab 120 may preferably be about 12.5% of the total width wt of the lead tab 120.

In other words, the location at which the first coupling hole 125a is formed may be denoted by a relative ratio of the first width w1 measured from the first edge e1 of the lead tab 120 to the total width wt of the lead tab 120, and the first width w1 and the total width wt may have a ratio of 1:8.

Similarly, the location at which the second coupling hole 125b is formed may be denoted by a relative ratio of the second width w2 measured from the second edge e2 of the lead tab 120 to the total width wt of the lead tab 120, and the second width w2 and the total width wt may be have a ratio of 1:8.

Figure 5:
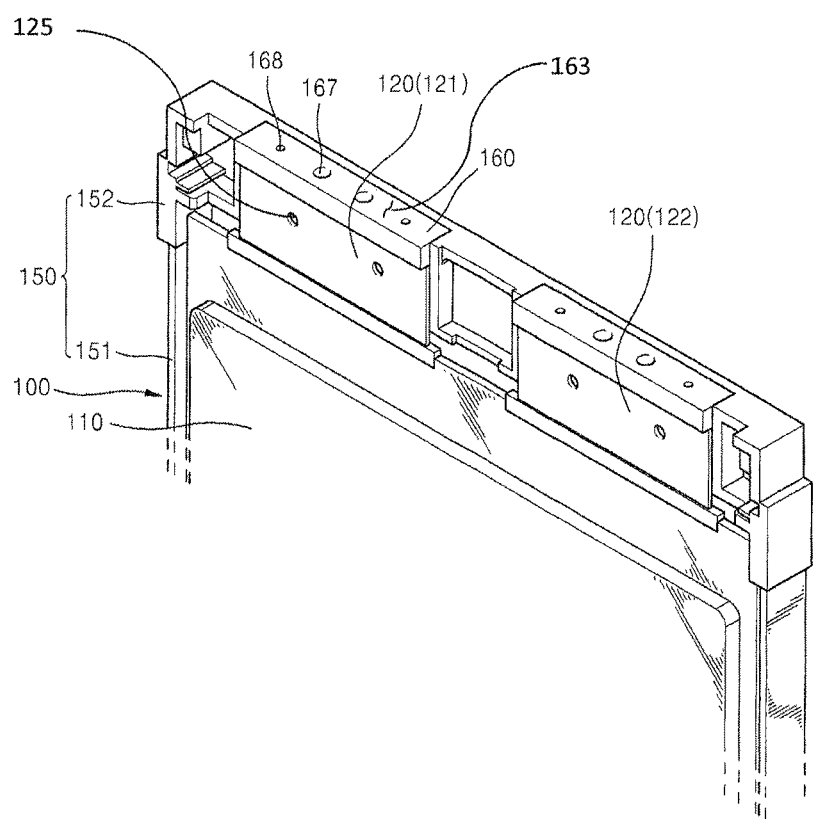
FIG. 5 is a top perspective view illustrating the battery pack of FIG. 1, according to an embodiment of the present invention.

Turning now to FIG. 5, FIG. 5 is a top perspective view illustrating the battery pack of FIG. 1, according to an embodiment of the present invention. Referring to FIG. 5, the lead member 160 is coupled to the second support portion 152 of the frame 150. For example, the lead member 160 may be coupled to the second support portion 152 such that the side surface 163 of the lead member 160 covers a distal end of lead tab 120 while being is exposed.

As illustrated in FIG. 5, side surface 163 of lead member 160 is perforated by a first side hole 167 and a second side hole 168. To electrically connect together a plurality of battery cells, a bus bar may be introduced to connect the lead members 160 from a plurality of battery units 100. The bus bar may be coupled to the side surface 163 each lead member 160 by a coupling member, such as a screw (not shown), that penetrates the bus bar while being inserted into first side hole 167. In other words, the bus bar itself is not inserted into first side hole 167, but is instead coupled to lead member 160 by the coupling member that is inserted into the first side hole 167 to couple the bus bar to the lead member 160. The bus bar may be arranged across side surfaces 163 of lead members 160 to connect the battery units to each other in an arrangement where a plurality of battery units are juxtaposed next to one another so that a plurality of battery units 100 have an upright position as illustrated in FIG. 5. By electrically connecting together a plurality of battery units as such, a structure for forming a middle to large sized battery having a large capacity and a high output may be produced.

Second side hole 168 arranged in side surface 163 of lead member 160 serves to detect a battery status such as temperature. For example, a thermometer chip may be arranged on the battery cell 110 to detect temperature, and a wiring-out from the thermometer chip is extracted through the second side hole 168. It is to be appreciated that temperature is just one example of a battery status that second side hole 168 can be used for, as a battery status other than temperature can be detected and an appropriate signal wiring-out could be extracted through second side hole 168 and still be within the scope of the present invention. Such an extraction of a battery status through second side hole 168 may allow a controller (not shown) to control charging and discharging operations of the battery units and second side hole 168 can serve as an input/output unit 168 of a transmission path so that a transmission path of signals and power to external devices may be formed.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A battery pack, comprising:
a battery unit including an electrode assembly arranged within a pouch and a plurality of lead tabs extending to an outside of the pouch and being electrically connected to the electrode assembly;
a frame to support the battery unit, the frame including a first portion to accommodate the pouch of the battery unit and a second portion to accommodate the lead tabs;
a plurality of lead members, each being arranged between corresponding ones of the lead tabs and the second portion of the frame; and
a plurality of coupling members to mechanically couple together the lead tabs, the lead member and the second portion of the frame,
wherein each of the lead members being a rectangular rigid metal block having two major surfaces opposite each other and a side surface perpendicular to the two major surfaces, each of the two major surfaces being perforated by a plurality of coupling apertures that accommodate a passage of the coupling members, the side surface being perforated by first and second side apertures, the first side aperture to couple with a bus bar and the second side aperture to provide input and output of electrical signals of a battery status from and to a controller to control the battery pack.

2. The battery pack of claim 1, each of the coupling members being electrically connected to a corresponding one of the lead members and a corresponding one of the lead tabs.

3. The battery pack of claim 1, the plurality of lead members including a first lead member and a second lead member, a portion of the second portion of the frame separating the first lead member from the second lead member.

4. The battery pack of claim 3, the second portion of the frame being comprised of an insulating material.

5. The battery pack of claim 4, the second portion of the frame including a first space that accommodates the first lead member and a second space that accommodates the second lead member.

6. The battery pack of claim 4, the lead members being integrally formed and inseparable from the second portion of the frame, the second portion of the frame being produced via an injection molding process where the lead members are arranged together in an injection molding frame during the injection molding process.

7. The battery pack of claim 6, wherein the second portion of the frame includes fixing protrusions that extend through fixing apertures of the lead members to prevent the lead members from being separated from the second portion of the frame.

8. The battery pack of claim 1, further comprising a plurality of conductive plates arranged over the lead tabs and being coupled to the frame, the lead members and the lead tabs by the coupling members.

9. The battery pack of claim 8, each of the lead tabs, the lead members, the second portion of the frame and the conductive plates being perforated by apertures through which corresponding ones of the coupling members extend.

10. The battery pack of claim 1, each of the frame, the lead members and the lead tabs are perforated by a plurality of apertures, the coupling members extending through the apertures of the frame, the lead members and the lead tabs.

11. The battery pack of claim 10, each of the coupling members being a nut and bolt assembly.

12. The battery pack of claim 10, each of said lead tabs being perforated by two apertures, each of said lead tabs having a left side and a right side opposite from said left side, wherein a total width of the lead tab being a distance from the left side to the right side, one of said two apertures being spaced-apart from the left side of the lead tab by ⅛th of the total width of the lead tab, another of the two apertures being spaced-apart from the right side of the lead tab by ⅛th of the total width of the lead tab.

13. The battery pack of claim 1, the first portion of the frame being comprised of a metal to provide mechanical rigidity and excellent thermal conductivity, the first portion including a flat plate with curved ribs arranged at two opposing edges of the flat plate to surround the battery unit.

14. The battery pack of claim 13, a height of the curved ribs being greater than a thickness of the battery unit.

15. The battery pack of claim 13, the flat plate to cover a first major surface of the battery unit, a second and opposite major surface of the battery unit being exposed by the frame.

16. The battery pack of claim 1, each of the lead tabs including a proximal end connected to the electrode assembly of the battery unit and a distal end furthest from the battery unit, a portion of each lead member covering the distal end of a corresponding one of the lead tabs.

17. A battery pack of claim 1, each of the lead tabs being in surface contact with a corresponding one of the lead members.

18. The battery pack of claim 17, further comprising a plurality of conductive plates arranged over the lead tabs and being mechanically coupled to the lead tabs.

* * * * *